(12) United States Patent
Nakamuta

(10) Patent No.: US 7,744,998 B2
(45) Date of Patent: Jun. 29, 2010

(54) PLASTICIZER-RESISTANT PRESSURE-SENSITIVE ADHESIVE COMPOSITION AND ADHESIVE ARTICLE

(75) Inventor: Shojitsu Nakamuta, Kokubunji (JP)

(73) Assignee: 3M Innovative Properties Company, St. Paul, MN (US)

(*) Notice: Subject to any disclaimer, the term of this patent is extended or adjusted under 35 U.S.C. 154(b) by 551 days.

(21) Appl. No.: 10/473,917

(22) PCT Filed: Apr. 22, 2002

(86) PCT No.: PCT/US02/13001
§ 371 (c)(1), (2), (4) Date: Oct. 2, 2003

(87) PCT Pub. No.: WO02/086002
PCT Pub. Date: Oct. 31, 2002

(65) Prior Publication Data
US 2004/0142167 A1   Jul. 22, 2004

(30) Foreign Application Priority Data
Apr. 25, 2001   (JP)   ............................. 2001-128006

(51) Int. Cl.
B32B 7/12   (2006.01)
(52) U.S. Cl. ..................... 428/355 CN; 428/317.3; 428/317.7; 428/355 AC
(58) Field of Classification Search ............ 428/355 R, 428/355 CN, 522; 526/326, 327, 328, 329.7
See application file for complete search history.

(56) References Cited
U.S. PATENT DOCUMENTS 3,705,076 A * 12/1972 Usala ........................ 428/421
3,842,059 A * 10/1974 Milkovich et al. .......... 525/292
3,873,640 A *  3/1975 Owston et al. .............. 525/126
4,554,324 A * 11/1985 Husman et al. ............. 525/301
4,822,676 A     4/1989 Mudge
4,943,461 A     7/1990 Karim
4,946,742 A *  8/1990 Landin ....................... 428/345
5,670,260 A *  9/1997 Zajaczkowski et al. ..... 428/345
5,766,703 A *  6/1998 Mori et al. ................... 428/31
5,861,211 A     1/1999 Thakkar et al.

(Continued)

FOREIGN PATENT DOCUMENTS
JP      59-122566       7/1984

(Continued)

OTHER PUBLICATIONS

Hawley's Condensed Chemical Dictionary, 13th edition, Edited by Richard J. Lewis Sr., p. 888-889, definition of "plasticizer", Van Nostrand Reinhold, 1997.*

(Continued)

Primary Examiner—James Seidleck
Assistant Examiner—John J Figueroa

(57) ABSTRACT

There is provided a pressure-sensitive adhesive composition which has a high initial adhesive strength to an adherend containing a plasticizer and can maintain the adhesive strength even after long-term use. A plasticizer-resistant pressure-sensitive adhesive composition comprising a copolymer obtained by polymerizing a monomer mixture comprising (a) an aromatic-containing (meth)acrylate monomer, (b) a nitrogen-containing vinyl monomer, and (c) an alkyl(meth)acrylate monomer, an alkyl group of which has 4 to 14 carbon atoms.

16 Claims, 1 Drawing Sheet

U.S. PATENT DOCUMENTS

| | | | |
|---|---|---|---|
| 5,905,099 A * | 5/1999 | Everaerts et al. | 522/126 |
| 6,066,394 A | 5/2000 | Hoff et al. | |
| 6,107,219 A * | 8/2000 | Joseph et al. | 442/361 |
| 6,198,016 B1 * | 3/2001 | Lucast et al. | 602/41 |
| 6,232,366 B1 * | 5/2001 | Wang et al. | 523/111 |
| 6,340,719 B1 * | 1/2002 | Goeb et al. | 522/174 |
| 6,441,092 B1 * | 8/2002 | Gieselman | 525/191 |
| 6,861,139 B2 * | 3/2005 | Takeda | 428/343 |
| 6,984,413 B2 * | 1/2006 | Yamamoto et al. | 427/208.4 |

FOREIGN PATENT DOCUMENTS

| | | |
|---|---|---|
| JP | 2-18486 | 1/1990 |
| JP | 08-253750 | 10/1996 |

OTHER PUBLICATIONS

Polymer Science Dictionary, 1st edition, edited by Mark Alger, p. 317, definition of "plasticiser", Elsevier Applied Science, 1989.*

Notice of Preliminary Rejection from the Korean Intellectual Property Office, dated Sep. 30, 2008.

* cited by examiner

PLASTICIZER-RESISTANT PRESSURE-SENSITIVE ADHESIVE COMPOSITION AND ADHESIVE ARTICLE

FIELD OF THE INVENTION

The present invention relates to a plasticizer-resistant acrylic pressure-sensitive adhesive composition which shows good adhesion to an adherend containing a plasticizer. The invention also relates to a pressure-sensitive adhesive article made therefrom.

BACKGROUND OF THE INVENTION

In case of applying a pressure-sensitive adhesive to a base material (adherend) formed from a resin containing a plasticizer (e.g. vinyl chloride resin), cross-migration of the plasticizer from the base material to the adhesive has occasionally caused plasticization of the adhesive itself, resulting in drastic reduction of an adhesive strength. Therefore, a conventional pressure-sensitive adhesive occasionally causes peeling due to reduction of a strength at the bonding portion with a lapse of time, thus making it impossible to perform satisfactory bonding.

U.S. Pat. No. 4,943,461 discloses a pressure-sensitive adhesive comprising (a) a copolymer of monomers consisting essentially of about 60 to 85 parts by weight of an acrylate of a non-tertiary alcohol, an alkyl of which has about 4 to 14 carbon atoms, and about 15 to 40 parts by weight of a polar nitrogen-containing vinyl monomer, and (b) an acrylonitrile-butadiene rubber in an amount of 1 to 10 parts based on the weight of the copolymer. It is described that this adhesive is capable of maintaining an adhesive strength to a plasticized vinyl base material for a long term and use of the acrylonitrile-butadiene rubber in combination with the specific acrylic polymer has an effect of enhancing a shear resistance to the plasticized base material.

Japanese Unexamined Patent Publication No. 2-18486 discloses, as a pressure-sensitive adhesive capable of maintaining an adhesion property to the plasticized polyvinyl chloride for a long term, a pressure-sensitive adhesive comprising a copolymer of monomers consisting essentially of 60 to 88 parts of an acrylate of an alcohol having 4 to 14 carbon atoms, 2 to 30 parts of a nitrogen-containing vinyl monomer and 0 to 12 parts of a vinylcarboxylic acid, and a plasticizer in an amount of 2 to 35% based on the copolymer. However, the adhesive has the following problem. Namely, since the adhesive contains the plasticizer, the adhesion property of the adhesive per se can not be exhibited even if stable adhesion property can be maintained and, therefore, it can not help sacrificing the adhesive strength.

SUMMARY OF THE INVENTION

Therefore, an object of the present invention is to provide a pressure-sensitive adhesive composition that has a higher initial adhesive strength to an adherend containing a plasticizer, than that of a typical conventional acrylic pressure sensitive adhesive, and can maintain the adhesive strength even after long-term use.

In one aspect of the present invention, there is provided a plasticizer-resistant pressure-sensitive adhesive composition comprising a copolymer obtained by polymerizing a monomer mixture comprising (a) an aromatic-containing (meth) acrylate monomer, (b) a nitrogen-containing vinyl monomer, and (c) an alkyl(meth)acrylate monomer, an alkyl group of which has 4 to 14 carbon atoms.

The adhesive composition has a high initial adhesive strength and can maintain the adhesive strength even after long-term use. This is because penetration of the plasticizer into the adhesive can be inhibited by using the aromatic-containing (meth)acrylate in combination with other monomers.

As used herein, the term "(meth)acrylate" refers to an acrylate and/or methacrylate.

In another aspect of the present invention, an article is provided that comprises the plasticizer resistant pressure-sensitive adhesive.

DETAILED DESCRIPTION OF THE INVENTION

Figure 1:
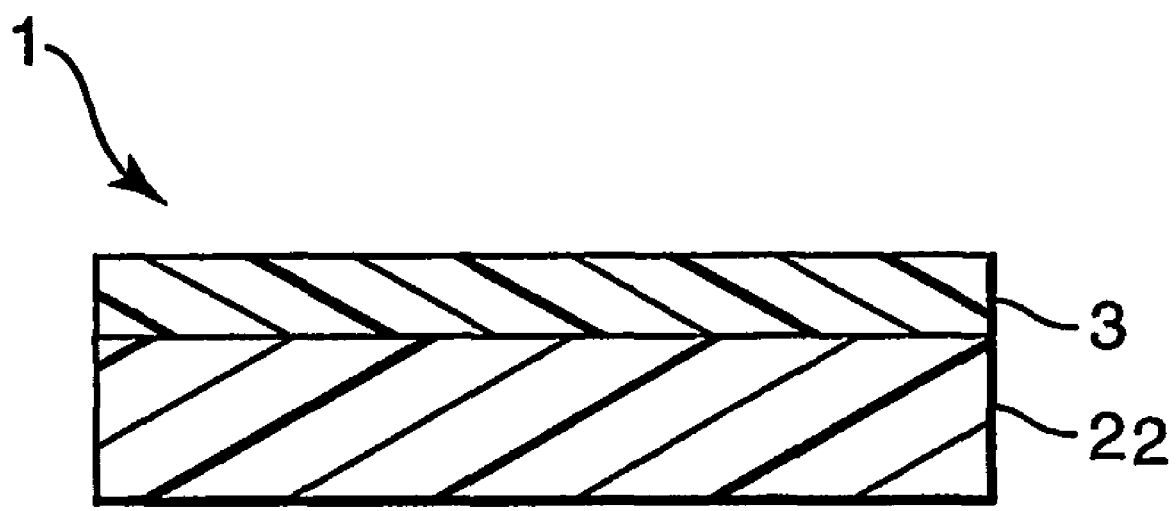
FIG. 1 is a sectional view showing one embodiment of the pressure-sensitive adhesive article according to the present invention.

The copolymer for the plasticizer-resistant adhesive composition is obtained by polymerizing a monomer mixture consisting of (a) an aromatic-containing (meth)acrylate monomer, (b) a nitrogen-containing vinyl monomer, and (c) an alkyl(meth)acrylate monomer, an alkyl group of which has 4 to 14 carbon atoms. The respective monomers will be described below.

(a) Aromatic-Containing (Meth)acrylate Monomer

The copolymer used in the adhesive composition according to the present invention contains (a) an aromatic-containing (meth)acrylate monomer as a polymerization unit. This monomer has an effect of preventing penetration and diffusion of the plasticizer into the adhesive. Therefore, reduction of the adhesive strength caused by penetration of the plasticizer into the adhesive is prevented. Accordingly, the adhesive can maintain stable adhesive strength for a long term.

Examples of the aromatic (meth)acrylate include phenyl (meth)acrylate, benzyl (meth)acrylate, phenoxyethyl(meth) acrylate, phenoxypropyl(meth)acrylate, phenoxydiethylene glycol(meth)acrylate, and phenoxyhydroxypropyl(meth) acrylate. It is particularly preferable that the aromatic containing (meth)acrylate is benzyl(meth)acrylate, phenyl(meth) acrylate, or phenoxyethyl(meth)acrylate, in the view of effectiveness of preventing penetration and diffusion of a plasticizer.

The aromatic-containing (meth)acrylate monomer is usually used in the amount within a range from 5 to 30% by weight based on the amount of (a) an aromatic-containing (meth)acrylate monomer, (b) a nitrogen-containing vinyl monomer, and (c) an alkyl(meth)acrylate monomer, an alkyl group of which has 4 to 14 carbon atoms. When the amount of this monomer is too small, it may be impossible to obtain the effect of inhibiting penetration of the plasticizer. On the other hand, when the amount is too large, it may be impossible to obtain a sufficient adhesive strength. The aromatic-containing (meth)acrylate is used in the amount of 5-20% by weight. In this case, adhesive strength of the adhesive would be comparatively high.

(b) Nitrogen-Containing Vinyl Monomer

The nitrogen-containing vinyl monomer has an effect of providing an adhesive composition which shows a high adhesive strength to a base material (adherend) containing a plasticizer. This monomer can also enhance a shear strength of the adhesive.

Examples of the nitrogen-containing vinyl monomer include N,N-dimethylacrylamide, N,N-dimethylmethacrylamide, N,N-diethylacrylamide, N,N-diethylmethacrylamide, N,N-dimethylaminoethyl methacrylate, N,N-dimethylaminopropyl methacrylate, N,N-dimethylaminoethyl acrylate, N,N-dimethylaminopropyl acrylate, N-hexylacrylamide, β-(dimethylamide)ethyl acrylate, N-methylacrylamide, N-ethylacrylamide, N-vinylpyrrolidone, N-vinyl caprolactone, and N,N-pentaethyleneacrylamide. Among the nitrogen-containing monomers, N,N-dimethylacrylamide, N,N-dimethylmethacrylamide and N,N-diethylacrylamide are preferred, since they can lower a glass transition temperature (Tg) of the polymer for the adhesive.

The nitrogen-containing vinyl monomer is usually used in the amount within a range from 30 to 70% by weight based on the amount of (a) an aromatic-containing (meth)acrylate monomer, (b) a nitrogen-containing vinyl monomer, and (c) an alkyl (meth)acrylate monomer, an alkyl group of which has 4 to 14 carbon atoms. When the amount of this monomer is too small, it may be impossible to obtain a sufficient adhesive strength to the base material. On the other hand, when the amount is too large, it may be impossible to obtain sufficient initial tack because the amount of the monomer (c) becomes to small. Preferably, the amount of the nitrogen-containing monomer will be 45 to 75% by weight based on the above monomers to ensure a sufficient adhesion strength.

(c) Alkyl(Meth)acrylate Monomer

The alkyl(meth)acrylate monomer has an effect of imparting tack to the adhesive. Such a monomer has an alkyl group having 4 to 14 carbon atoms. Examples of useful (meth)acrylate monomer include n-butyl(meth)acrylate, isobutyl (meth)acrylate, 2-methylbutyl(meth)acrylate, 2-ethylhexyl (meth)acrylate, n-octyl(meth)acrylate, isooctyl (meth)acrylate, isononyl(meth)acrylate, and isodecyl(meth)acrylate. Among the alkyl(meth)acrylate monomers, 2-ethylhexyl(meth)acrylate, isooctyl(meth)acrylate and n-octyl(meth)acrylate are preferred, since they can easily impart tack to the adhesive in addition to the adhesive strength.

The alkyl(meth)acrylate monomer, an alkyl group of which has 4 to 14 carbon atoms, is usually used in the amount within a range from 20 to 50% by weight based on the amount of (a) an aromatic-containing (meth)acrylate monomer, (b) a nitrogen-containing vinyl monomer, and (c) an alkyl(meth)acrylate monomer, an alkyl group of which has 4 to 14 carbon atoms. When the amount of this monomer is too small, it may be impossible to obtain sufficient initial tack. On the other hand, when the amount is too large, stickiness drastically increases with degradation of the plasticizer resistance of the adhesive and the adhesive can not be put in practical use. Preferably, the amount of alkyl(meth)acrylate monomer is 30 to 50% by weight based on the above monomers to ensure an initial tack.

Other Monomer Components

The copolymer used in the adhesive composition according to the present invention can contain other copolymerizable monomers such as acrylic acid, methacrylic acid and the like in a small amount as far as the effect of the present invention is not adversely affected. However, a copolymer consisting of the monomers (a), (b) and (c) is preferred for the adhesive composition of the present invention.

Crosslinking Agent

The copolymer used in the adhesive of the present invention may be optionally crosslinked. The crosslinking agent is usually used in the amount within a range from about 0.05 to 1% by weight based on the total amount of the monomers, thereby making it possible to enhance the shear adhesion property and heat resistance of the adhesive. As the crosslinking agent, a polyfunctional acrylate, for example, a crosslinking monomer such as 1,6-hexanediol diacrylate, trimethylolpropane triacrylate, pentaerythritol tetracrylate, 1,2-ethylene glycol diacrylate, 1,12-dodecanediol diacrylate or the like can be used. Other crosslinking agents are substituted triazines such as 2,4-bis(trichloromethyl)-6-p-methoxystyrene-5-triazine and monoethylenically unsaturated aromatic ketone such as 4-acryloxybenzophenone.

Other Components

The adhesive of the present invention can contain additives such as fillers, pigments, foaming agents, antioxidants, surfactants, stabilizers, and viscosity modifiers.

Substrate

The adhesive of the present invention is usually used as a pressure-sensitive adhesive article comprising a substrate and a layer of the pressure-sensitive adhesive composition of the present invention, which is formed on the substrate. Examples of the adhesive article include forms such as a pressure-sensitive adhesive sheet, tape and strip. When the substrate is subjected to a releasing treatment, the adhesive is used as a transfer type adhesive article. Examples of the substrate, which is useful for the tape, include acrylic foam, polyester film treated with silicone, and polyethylene film. One embodiment of the adhesive article according to the present invention is shown in FIG. 1, in which a pressure-sensitive adhesive article 1 is obtained by coating the pressure-sensitive adhesive composition of the present invention on a substrate 2 using a proper coating method such as knife-coating to form a layer 3 of the pressure-sensitive adhesive.

Adherend

Regarding the adhesive composition of the present invention, the adhesive strength to an adherend containing a plasticizer is enhanced. Such an adherend is particularly made of a resin such as polyvinyl chloride, or an elastomer such as ethylene-propylene-diene terpolymer (EPDM). This adherend usually contains a plasticizer and forms, for example, emblem, body side molding and weather strip in the automobile industry.

Polymerization Method

Usually, the copolymer of the adhesive is obtained by polymerizing the monomers described above by a radical polymerization method such as solution polymerization, emulsion polymerization, suspension polymerization, or bulk polymerization. The polymerization is initiated by heat or radiation (light) in the presence of a polymerization initiator (hereinafter also referred to as an "initiator"). The polymerization initiator is not specifically limited as far as it can initiate the polymerization. In case of the heat polymerization, initiators, for example, azobis compounds such as 2,2'-azobisisobutyronitrile, 2,2'-azobis(2-methylbutyronitrile) or 2,2-azobis(2,4-dimethylvaleronitrile), and peroxides such as benzoyl peroxide or lauroyl peroxide can be used. In case of the photopolymerization, initiators, for example, benzoyl ether such as benzoin methyl ether or benzoin isopropyl ether, and substituted benzoin ether such as anisole methyl ether, substituted acetophenone, 2,2-diethoxyacetophenone or 2,2-dimethoxy-2-phenylacetophenone can be used. The amount of the polymerization initiator is not specifically limited, but is generally within a range from 0.005 to 0.5% by weight based on the weight of the monomers.

In case of the radiation polymerization with radiation such as ultraviolet light (UV), a substrate is coated with a monomer mixture, together with a proper photoinitiator and an optional crosslinking agent and, after removing dissolved oxygen in an atmosphere of an inert gas such as nitrogen, the polymerization is conducted by irradiating with radiation such as ultraviolet light. To improve the coating property to the substrate, the monomer may be partially polymerized by irradiation with a fixed amount of radiation until a syrup having a proper viscosity, for example, viscosity of 1-5 Pa·s (1000-5000 cps) is obtained, and then the substrate is coated with the syrup and the polymerization is completed by additional irradiation with a radiation.

In case of the solution polymerization wherein the polymerization of the monomers is thermally initiated, the components such as monomer etc. are dissolved in a proper solvent such as ethyl acetate, methyl ethyl ketone, heptane and the like. Usually, the polymerization can be conducted at the reaction temperature of about 50° C. or higher for 3 to 24 hours in an atmosphere of an inert gas such as nitrogen. An adhesive article is formed by coating the substrate with the resulting polymer solution by means of knife coating and vaporizing the solvent.

EXAMPLES

The following Examples further illustrate the present invention. In the Examples, parts and percentages are by weight unless otherwise specified.

Example 1

To a monomer mixture consisting of 25.0 g of benzyl acrylate (BZA) as an aromatic-containing (meth)acrylate, 50.0 g of N,N-dimethylacrylamide (NNDMA) as a nitrogen-containing vinyl monomer and 25.0 g of 2-ethylhexyl acrtylate as an alkyl (meth)acrylate, 0.04 g of Irgacure-651 (manufactured by Ciba Chemical Specialty Co.) as an initiator was added and dissolved oxygen was removed in a nitrogen atmosphere. The resulting mixture was irradiated with 3 mW ultraviolet light to obtain a syrup made of a prepolymer having a viscosity 3 Pa·s (3000 cps). To this syrup, 0.1 g of Irgacure-651 (an initiator) and 0.08 g of 1,6-hexanediol diacrylate as a crosslinking agent were further added, followed by stirring. Then, a substrate (thickness: 50 μm, width: 150 mm) made of a PET film, the surface of which had been treated with silicone, was coated with the syrup in a thickness of 0.1 mm, which was cured by irradiating with 1 mW ultraviolet light to obtain a pressure-sensitive adhesive article (pressure-sensitive adhesive sheet).

Examples 2 to 8

In the same manner as in Example 1, except that the mixing ratio of the monomers was changed as shown in Table 1 below, adhesive articles were produced.

Comparative Example 1

In the same manner as in Example 1, except that a mixture of 90 g of 2-ethylhexyl acrylate and 10 g of acrylic acid was used in place of three kinds of monomers of the present invention, an adhesive article was produced.

Each of the resulting adhesive sheets was applied to a backing consisting of polyethylene terephtalate (PET) and was cut to obtain an adhesive sheet having a width of 12 mm. After which, it was attached to a polyvinyl chloride sheet by pressing through a 2 kg rubber roller to give a test sample (room temperature: 20° C.). The adhesive strength of the sample was measured by a 180° peel test (tensile rate: 50 nm/min.). The test sample was aged by allowing to stand in an oven at 70° C. for a week and the adhesive strength after aging was also measured in the same manner. The results of Examples 1 to 8 and Comparative Example 1 are shown in Table 1 below.

TABLE 1

| Ex. No. | Amount of monomer (g) | | | | 180° peel adhesive strength (N/12 mm) | |
|---|---|---|---|---|---|---|
| | BZA | NNDMA | 2EHA | AA | 20° C. | After aging |
| 1 | 25.00 | 50.00 | 25.00 | — | 30.00 | 31.25 |
| 2 | 10.00 | 40.00 | 50.00 | — | 22.79 | 24.93 |
| 3 | 10.00 | 50.00 | 40.00 | — | 30.00 | 29.90 |
| 4 | 21.67 | 41.67 | 36.67 | — | 30.00 | 30.37 |
| 5 | 25.00 | 25.00 | 50.00 | — | 21.05 | 22.53 |
| 6 | 33.33 | 33.33 | 33.33 | — | 18.35 | 16.49 |
| 7 | 40.00 | 10.00 | 50.00 | — | 14.10 | 13.25 |
| 8 | 50.00 | 25.00 | 25.00 | — | 23.38 | 16.86 |
| Comp Ex. 1 | | 90.00 | | 10.00 | 30.00 | 10.28 |

As is apparent from the results described above, while an adhesive strength is drastically reduced after aging in a conventional acrylic pressure-sensitive adhesive composition, the adhesive composition of the present invention has a permissible high initial adhesive strength and does not cause drastic reduction of the adhesive strength even after aging.

According to the present invention, there is provided a pressure-sensitive adhesive composition which has a high initial adhesive strength to an adherend containing a plasticizer and can maintain the adhesive strength even after long-term use.

I claim:

1. A pressure-sensitive adhesive article comprising:
   a) an adherend having a plasticizer; and
   b) a plasticizer-resistant pressure-sensitive adhesive composition comprising a copolymer comprising the reaction product of a monomer mixture comprising:
      i. 5 to 30% by weight of an aromatic-containing (meth)acrylate;
      ii. 30 to 70% by weight of a nitrogen-containing vinyl monomer; and
      iii. 20 to 50% by weight of an alkyl(meth)acrylate comprising an alkyl group having from 4 to 14 carbon atoms.

2. The pressure-sensitive adhesive article of claim 1, wherein the monomer mixture further comprises a crosslinking agent.

3. The pressure-sensitive adhesive article of claim 1, wherein the aromatic-containing (meth)acrylate is phenyl (meth)acrylate, benzyl(meth)acrylate, phenoxyethyl(meth)acrylate, phenoxypropyl(meth)acrylate, phenoxydiethylene glycol (meth)acrylate, or phenoxyhydroxypropyl(meth)acrylate.

4. The pressure-sensitive adhesive article of claim 1, wherein the aromatic-containing (meth)acrylate is benzyl (meth)acrylate, phenyl(meth)acrylate, or phenoxyethyl (meth)acrylate.

5. The pressure-sensitive adhesive article of claim 1, wherein the nitrogen-containing vinyl monomer is N,N-dimethylacrylamide, N,N-dimethylmethacrylamide, N,N-diethylacrylamide, N,N-diethylmethacrylamide, N,N-dimethylaminoethyl methacrylate, N,N-dimethylaminoethyl acrylate, N,N-dimethylaminopropyl methacrylate, N,N-dimethylaminopropyl acrylate, N-hexylacrylamide, β-(dimethylamide)ethyl acrylate, N-methylacrylamide, N-ethylacrylamide, N-vinylpyrrolidone, N-vinyl caprolactone, or N,N-pentaethyleneacrylamide.

6. The pressure-sensitive adhesive article of claim 1, wherein the nitrogen-containing vinyl monomer is N,N-dimethylacrylamide, N,N-dimethylacrylamide, N,N-dimethylmethacrylamide, or N,N-diethylacrylamide.

7. The pressure-sensitive adhesive article of claim 1, wherein the alkyl (meth)acrylate monomer is N-butyl(meth)acrylate, isobutyl(meth)acrylate, 2-methylbutyl (meth)acrylate, 2-ethylhexyl(meth)acrylate, n-octyl(meth)acrylate, isooctyl(meth)acrylate, isononyl(meth)acrylate, or isodecyl (meth)acrylate.

8. The pressure-sensitive adhesive article of claim 1, wherein the alkyl (meth)acrylate monomer is 2-ethylhexyl (meth)acrylate, isooctyl(meth)acrylate, or n-octyl (meth) acrylate.

9. The pressure-sensitive adhesive article of claim 1, wherein the monomer mixture is free of acrylic acid and methacrylic acid.

10. The pressure-sensitive adhesive article of claim 1, further comprising a substrate, wherein the pressure-sensitive adhesive is between the substrate and the adherend, said substrate being an acrylic foam, polyester film treated with silicone, or polyethylene film.

11. The pressure-sensitive adhesive article of claim 1, further comprising a substrate, wherein the pressure-sensitive adhesive is between the substrate and the adherend, said substrate being an acrylic foam.

12. The pressure-sensitive adhesive article of claim 1, wherein the adherend comprises a polyvinyl chloride.

13. The pressure-sensitive adhesive article of claim 1, wherein the adherend comprises an elastomer.

14. The pressure-sensitive adhesive article of claim 13, wherein the elastomer is an ethylene-propylene-diene terpolymer.

15. The pressure-sensitive adhesive article of claim 1, wherein the adherend is an emblem, body side molding, or weather strip.

16. The pressure-sensitive adhesive article of claim 1, wherein said plasticizer-resistant pressure-sensitive adhesive composition exhibits an initial adhesive strength to a polyvinyl chloride sheet, after pressing with a 2 kg rubber roll, as measured by a 180° peel test at 20° C. of at least 14.10 N/12 mm, and an aged adhesive strength to a polyvinyl chloride sheet, after pressing with a 2 kg rubber roll and being subjected to an oven temperature of 70° C. for a week, as measured by a 180° peel test at 20° C. of at least 13.25 N/12 mm.

* * * * *

UNITED STATES PATENT AND TRADEMARK OFFICE
CERTIFICATE OF CORRECTION

PATENT NO. : 7,744,998 B2
APPLICATION NO. : 10/473917
DATED : June 29, 2010
INVENTOR(S) : Shojitsu Nakamuta It is certified that error appears in the above-identified patent and that said Letters Patent is hereby corrected as shown below:

Column 3
Lines 21-22, delete "becomes to" and insert -- becomes too --, therefor.

Column 4
Line 4, delete "tetracrylate," and insert -- tetraacrylate, --, therefor.

Column 5
Lines 32-33, delete "acrtylate" and insert -- acrylate --, therefor.
Line 61, delete "terephtalate" and insert -- terephthalate --, therefor.
Lines 66-67, delete "50 nm/min.)." and insert -- 50 mm/min.). --, therefor.

Signed and Sealed this
Twelfth Day of April, 2011

David J. Kappos
*Director of the United States Patent and Trademark Office*